April 10, 1928.  1,665,971

F. MICHOTTE

DECORTICATING MACHINE

Filed April 26, 1927    4 Sheets-Sheet 1

Inventor
F. Michotte
by Wilkinson & Giusta
Attorneys.

April 10, 1928.  1,665,971

F. MICHOTTE

DECORTICATING MACHINE

Filed April 26, 1927    4 Sheets-Sheet 2

Inventor
F. Michotte
by Wilkinson & Giusta
Attorneys

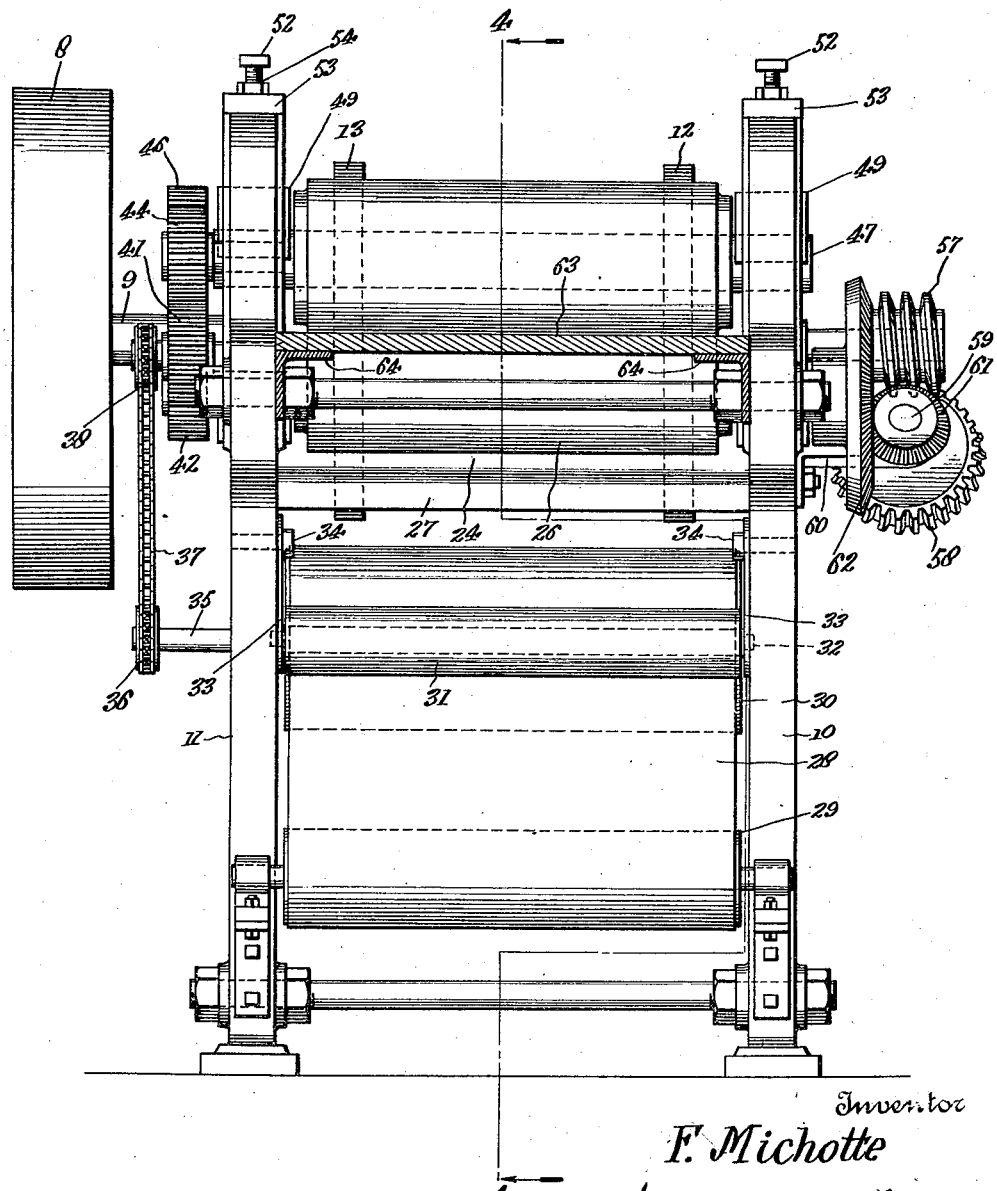

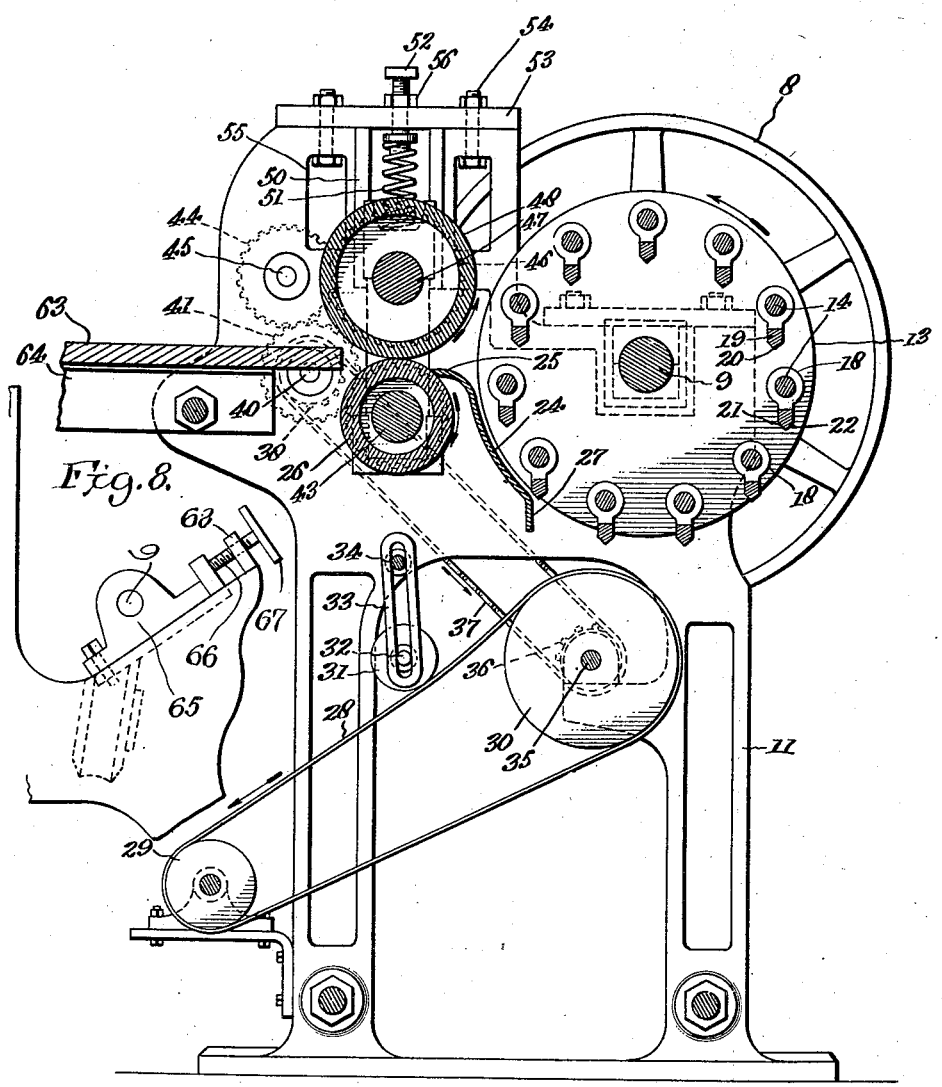

Patented Apr. 10, 1928.

1,665,971

UNITED STATES PATENT OFFICE.

FELICIEN MICHOTTE, OF PARIS, FRANCE, ASSIGNOR, BY MESNE ASSIGNMENTS, TO RAMIE CORPORATION OF AMERICA, INC., OF NEW ORLEANS, LOUISIANA, A CORPORATION OF LOUISIANA.

DECORTICATING MACHINE.

Application filed April 26, 1927. Serial No. 186,707.

The present invention relates to improvements in decorticating machines, and has for an object to provide an improved machine designed more particularly for decorticating ramie, although it is to be understood that it may be useful in connection with the crushing, beating and scraping of the stalks or leaves of other fibrous plants.

Another object of the invention lies in providing a continuously operating machine for subjecting the stalks or leaves in one passage through the machine to the three fold action of crushing, beating and scraping the same, and to achieve these several results entirely automatically.

A further object of the invention is to provide an improved beater construction, which will eliminate in a large measure the air currents, which, heretofore, have had a tendency to cause winding of the material about the rollers or beaters.

A still further object of the invention is to construct the beaters and scrapers of such shape and in small sections, and to mount the same loosely whereby they will break and scrape stalks of all woody substance without breaking the fiber, which is scraped clean by the beveled edges of these small beaters.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved decorticating machine constructed in accordance with the present invention.

Figure 3 is an opposite end view with the table cut on the line 3—3 indicated in Figure 1.

Figure 4 is a vertical section taken on the line 4—4 in Figure 3.

Figure 8 is a fragmentary elevation of a slight modification showing an adjustable bearing.

Figure 1:
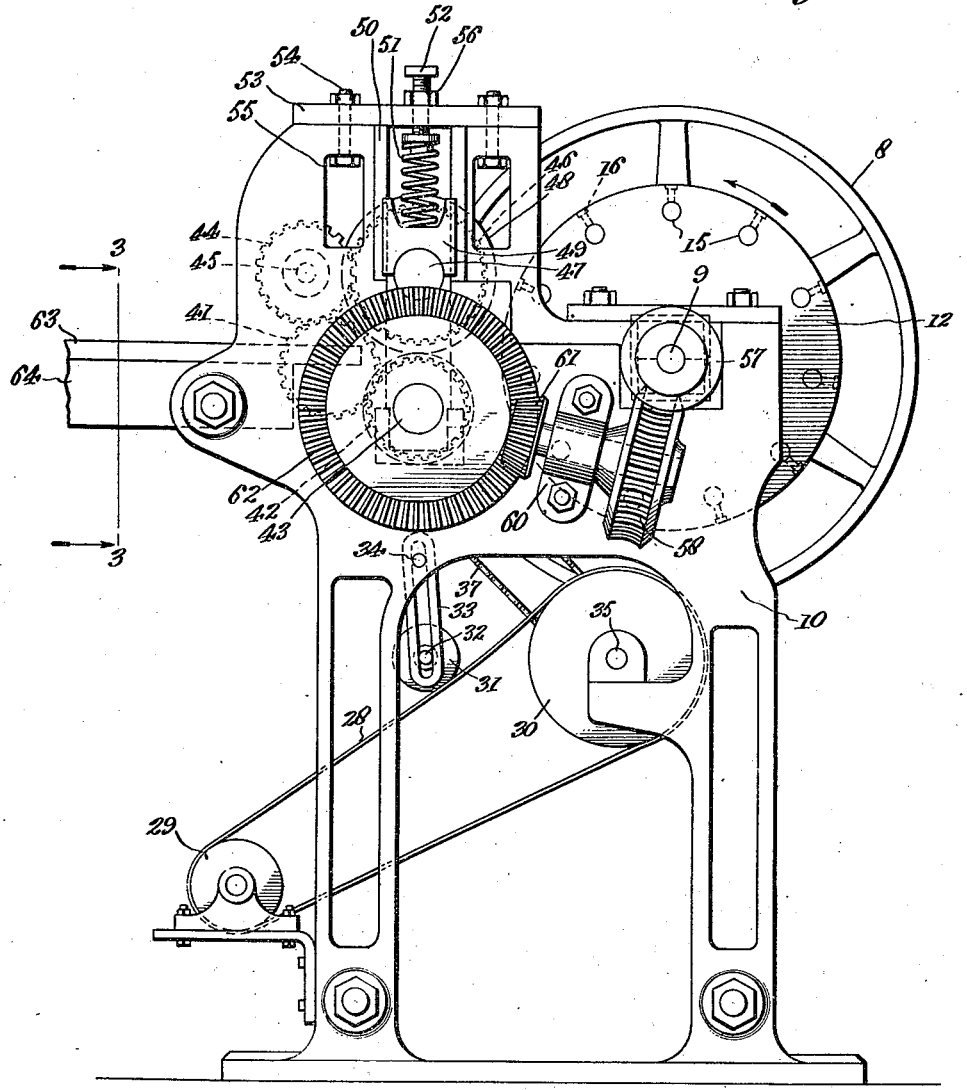

Referring more particularly to the drawings 8 designates a pulley or belt wheel adapted to be driven from an appropriate source of power. This belt wheel is mounted on a shaft 9 journaled in appropriate bearings in the two side frames 10 and 11 of the machine. Between the side frames, the shaft 9 carries the beater drum or cylinder composed of the two heads 12 and 13 and the bars 14 which connect these heads. The ends of the bars, as shown in Figure 1, are fitted into the sockets 15 made in the heads, such ends being secured in place by the set screws 16 accessible to a screw driver, or other implement from the peripheral edges of the drum heads.

Figures 5, 6, 7:
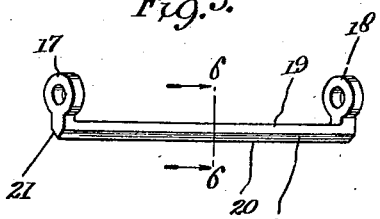
Figure 5 is a perspective view of one of the beater elements.
Figure 6 is a cross section taken on the line 6—6 in Figure 5, and shown on an enlarged scale.
Figure 7 is a transverse section similar to Figure 6 but of a slight modification.

On each rod 14 are mounted several beater members or elements, as shown in Figures 5 and 6, in which 17 and 18 represent terminal eyes upstanding from the beater bar 19. The eyes are at substantially right angles to the longitudinal axis of the bar 19; the axes of the eyes are coincident and they are arranged to be pivotally hung upon the rods 14. The beater bar 19 itself may be of the cross sectional construction, shown in Figure 6, in which the free or active portion of the bar is pointed or sharpened as indicated at 20. In forming this construction the beveled or diagonal faces 21 and 22 are formed converging to the ridge 20. A modified construction of beater bar is shown in Figure 7 in which the bar 19ª is formed with the ridge or scraping edge 20ª along one face thereof, there being a transverse diagonal lower face 23 extending downwardly from one face of the bar to the razor edge 20ª.

The beater drum is disposed opposite a beater or breast plate 24 appropriately supported in the side frames 10 and 11 and having an intermediate arcuate portion spaced from the beater drum, but formed substantially on the same arc therewith. The upper terminal portion 25 of the breast plate 24 is curved outwardly from the beater drum and substantially radially or horizontally therefrom and against, or close to, the periphery of a hollow roller 26.

The lower edge 27 of the breast plate 24 is bent down substantially vertically and away from the drum in position to permit the treated plant or stalks to fall upon a conveyor belt 28 disposed about the rollers 29 and 30 mounted in the legs of the machine framework, the roller 29 being lowermost and smaller, while the upper larger roller 30 is disposed directly beneath the beater drum, although to one side of the vertical line passing through the center of the drum shaft 9.

The upper roller 30 constitutes a drive roller and to effect good tractive engagement a belt tightener roller 31 is preferably arranged to bear upon the belt 28, this tightener roller 31 possessing sufficient weight to take up the slack in the belt 28 and cause it to grip tightly about the drive roller 30. The end trunnions 32 of the tightener roller 31 are disposed to slide freely in the slots of guide arms 33, which arms are suspended from rods 34 on the framework projecting through the slots of said guide arms. By reason of this construction the weighted rollers 31 are permitted both a lateral swinging and vertically sliding movement compensating for any inequalities in the belt rollers and to permit the roller 31 to ride over the falling stalks.

Figure 2:
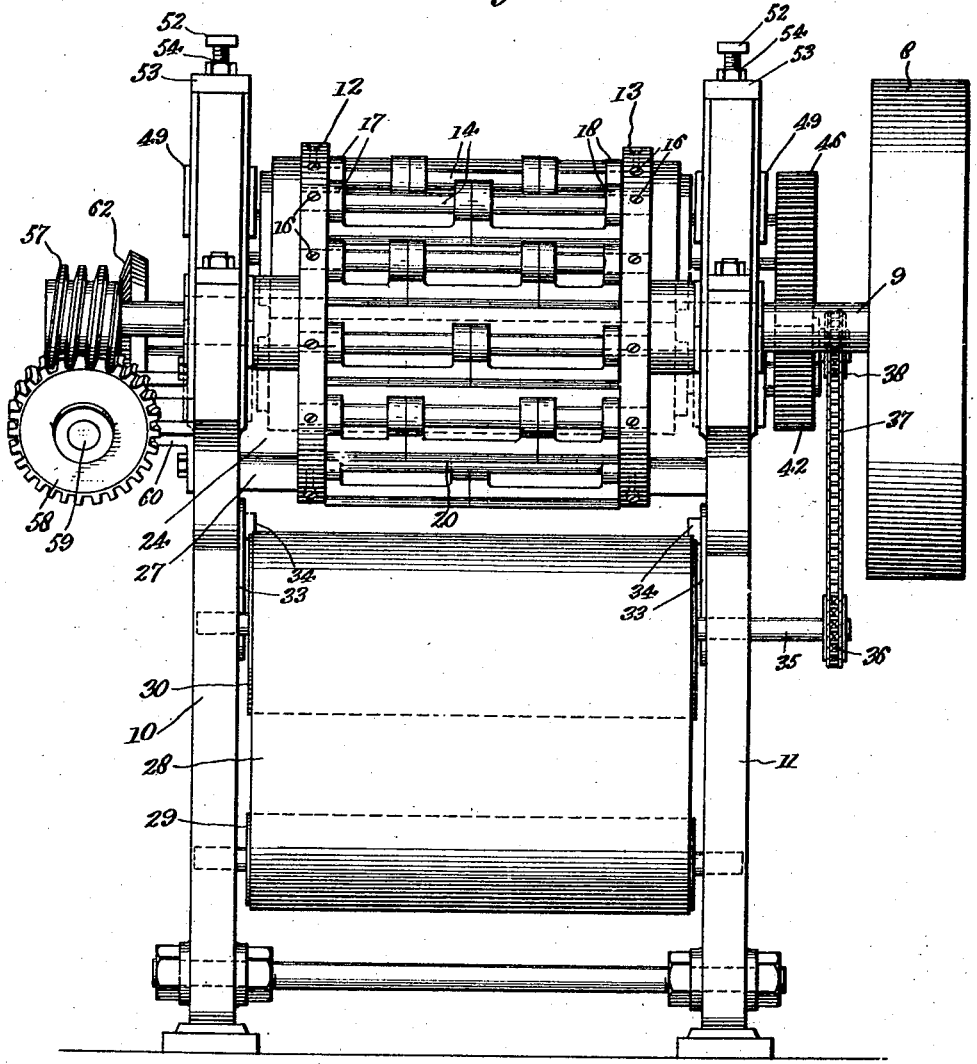
Figure 2 is an end elevation of the same as seen from the right of Figure 1.

The shaft 35 for the drive roller 30 is extended to one side of the side frame 11, as shown in Figures 2 and 3, where it is provided with a sprocket wheel 36 designed to be engaged by a chain 37. This chain engages at its opposite end a further sprocket wheel 38 mounted upon a stub shaft 40 appropriately mounted in the side frame 11. Such stub shaft carries the pinion 41 meshing at one side with the pinion 42 on the shaft 43 of the hollow roller 26, and at its other side with the idler pinion 44 upon the stub shaft 45 mounted in appropriate bearings in the side frame 11. The last mentioned pinion 45 meshes with a pinion 46 upon the shaft 47 of a second hollow roller 48, which is mounted upon the hollow roller 26. As shown to advantage in Figure 4 the diameter of the upper roller 48 exceeds greatly that of the lower roller 26. The trunnions of the lower roller are preferably fixed, while those of the upper roller are mounted in slidable guides 49 movable vertically in the guideways 50 provided in the side frames. Coil springs 51 are arranged to exert pressure upon the guide blocks 49 and trunnions of the roller 48, and the tension of these coil springs are regulated by the set screws 52, which engage threadedly through the cross bars 53 disposed above and bridging the upper ends of the guideways.

These cross bars may be held in place by the bolts 54, the heads of which are disposed within the cut out portions 55 of the framework, and the nut ends of which are disposed upwardly and above the bars 53. The lock nuts 56 are also preferably associated with the set screws 52 in order to hold the parts in the adjusted position.

The beater shaft 9 on the end opposite to the pulley wheel 8 is provided with a worm 57 disposed in mesh with a worm wheel 58 mounted on one end of a stub shaft 59 carried diagonally and held to the outside of the side frame 10 as by the U-shaped metal straps or clip 60, shown best in Figure 1. The higher end of the stub shaft 59 carries the beveled pinion 61 in mesh with a large bevel gear 62 fixed to the shaft 43 of the lower, hollow, smaller roller 26.

The receiving table is indicated at 63, and is shown as supported at its opposite edges by the angle irons 64 bolted or otherwise secured between the frames.

In the use of the device, the stalks of the plants are placed upon the table 63 and advanced endwise between the rollers 26 and 48, both of which rollers are preferably of polished metal. These rollers serve as feed rollers for the machine as they draw in the stalks which are pinched in the bight between the two rollers, this bight being regulated by the weight of the upper larger roller 48 and the degree of the spring pressure imposed, which spring presure can be regulated as aforesaid. The rolls 26 and 48 subserve the further function of acting to crush the stalks and to break and crack the hard woody coating surrounding the inner fibrous core. By virtue of the differential diameters of these hollow cylinders and the position of the roller of larger diameter above, leaves are more readily released from the stalks, the stalks and fiber are prevented from wrapping around the rollers and beater. The object of such roller construction is also to reduce to a minimum the unhackled ends of the the stalks.

The rollers automatically pass the crushed stalks to the beater and to the breast or beater plate 24, which later is preferably of highly polished bronze. The lip 25 of this breast plate is conductive to the receiving crushed stalks between the beater plate 24 and beater drum and the lip 25 scrapes the lower drum 26 but further prevents any of the material from clinging to, or winding about this roller.

During the interval that the stalks are passing between the beater drum and the breast plate 24, the beaters 19 are subjecting the same to a breaking and a scraping action, such as to remove from the stalks all of the woody outer substance but without breaking the fiber. The sharp edges of the beaters will act to scrape the stalks and being pivoted and subject to swinging by virtue of the centrifugal force developed during the rotation of the beater drum, such beater bars 19 will also be bodily thrown against the stalks in the trough, which is formed by the beater plate 24 and will in addition to scraping the stalks, also break the same. The material thus broken is subsequently scraped from the stalks. The wood pulp is thus removed leaving the fiber entirely clean.

The decorticated material then drops upon the belt 28 where it is carried to an appropriate destination for further treatment. The construction of the beater cylinder permits the rapid removal of the beater element by simply withdrawing the set screws 16 and separating the cylinder heads 12 and 13. In this way the beaters may be rapidly exchanged. For instance at times it is preferable to use the type of beater, shown in Figure 7. The scrapers and beaters are loose, and therefore not apt to become clogged or jammed by the material and by virtue of the movement of these beater bars by centrifugal force they will clear themselves of any clinging material.

The open construction of the beater drum also eliminates in a large measure air currents which have had a tendency with prior constructions to create a tendency of the material to accumulate around the rollers and beater.

The shaft 9 may, as shown in Figure 8, be mounted in a slidable bearing block 65 to which is attached the screw spindle 66 having threaded engagement through the lugs 68 on the frame of the machine. The spindle is revolved by means of the hand wheel 67, so that the beater may be moved toward or from the counter beater or plate, and thus vary the distance between those two cooperating members.

It is obvious that various changes and modifications may be made in the details of construction and design of the above specifically described embodiment of this invention without departing from the spirit thereof, such changes and modifications being restricted only by the scope of the following claims:—

What is claimed is:—

1. A decorticating machine comprising feed means, a breaker and scraping means comprising a backing plate, a cylinder mounted for rotation adjoining said backing plate, rods forming part of said cylinder, and scraper bars having offset eyes mounted pivotally on said rods, said bars having the longitudinal free edges thereof presenting a pointed scraping blade.

2. A decorticating machine comprising a backing plate, a drum mounted for rotation adjacent backing plate and comprising socketed spaced heads, rods having their ends removably mounted in the sockets in said heads, sharpened cylinder bars loosely hung on said rods, and means for feeding the stalks to said cylinder and backing plate.

3. A decorticating machine comprising a pair of feed rolls, a beater cylinder, a breast plate having an upper lip arranged immediately adjoining the bight between the feed rollers and adjacent the surface of the lower roller, the body portion of said breast plate being curved to conform substantially to the curvature of said beater cylinder and arranged in close but spaced relation to the cylinder, and a conveyor disposed with its receiving end below the lower end of said breast plate.

4. A decorticating machine comprising a feed table, a breaker cylinder comprising a shaft, rotary heads on the shaft, rods coupling said heads and extending parallel with the axis of the cylinder, beater bars having beating sharpened edges at one side and offset eyes at the opposite side for pivotally engaging said rods, means for driving said cylinder, a pair of weighted smooth feed rolls arranged one above the other with the bight therebetween close to said table at one side and to said cylinder at the opposite side, said upper roll being of larger diameter than the lower roll, and a breast plate disposed close to a portion of the cylinder and having an upward curved lip lying beneath the space extending between the bight of the rolls and the adjoining portion of the cylinder.

FELICIEN MICHOTTE.